United States Patent
Jordan

(10) Patent No.: US 9,821,740 B2
(45) Date of Patent: Nov. 21, 2017

(54) VEHICLE BUMPER ASSEMBLY

(71) Applicant: Ford Global Technologies, LLC, Dearborn, MI (US)

(72) Inventor: Marcus Jordan, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/077,496

(22) Filed: Mar. 22, 2016

(65) Prior Publication Data

US 2017/0274852 A1 Sep. 28, 2017

(51) Int. Cl.
*B60R 19/24* (2006.01)

(52) U.S. Cl.
CPC ........ *B60R 19/24* (2013.01); *B60R 2019/247* (2013.01)

(58) Field of Classification Search
CPC .................. B60R 19/24; B60R 2019/247
See application file for complete search history.

(56) References Cited

U.S. PATENT DOCUMENTS

| | | |
|---|---|---|
| 4,465,312 A | 8/1984 | Werner |
| 4,509,782 A | 4/1985 | Manning |
| 6,554,176 B2 | 4/2003 | McGill |
| 6,595,502 B2 | 7/2003 | Koch et al. |
| 6,695,368 B1 | 2/2004 | Weykamp et al. |
| 7,210,719 B2 | 5/2007 | Honda et al. |
| 7,399,015 B2 | 7/2008 | Patel et al. |
| 7,854,454 B2 | 12/2010 | Yang et al. |
| 7,926,865 B2 | 4/2011 | Terada et al. |
| 7,931,318 B2 | 4/2011 | Matsumura |
| 8,029,033 B2 | 10/2011 | Hama et al. |
| 8,414,041 B2 | 4/2013 | Paare et al. |
| 8,454,080 B2 | 6/2013 | Qu et al. |
| 8,662,546 B2 | 3/2014 | Kizaki et al. |
| 8,733,823 B2 | 5/2014 | Brockhoff et al. |
| 8,936,299 B2 | 1/2015 | Tanaka et al. |
| 8,985,671 B1 | 3/2015 | Lei et al. |
| 8,991,903 B1 | 3/2015 | Alavandi et al. |
| 9,045,100 B2 | 6/2015 | Kaneko et al. |

(Continued)

FOREIGN PATENT DOCUMENTS

| | | |
|---|---|---|
| CA | 2571390 A1 | 11/2006 |
| CN | 203402258 U | 1/2014 |

(Continued)

OTHER PUBLICATIONS

Non-Final Office Action dated Apr. 12, 2017; U.S. Appl. No. 15/077,504, filed Mar. 22, 2016.

*Primary Examiner* — Glenn Dayoan
*Assistant Examiner* — Melissa A Black
(74) *Attorney, Agent, or Firm* — Jason C. Rogers; Bejin Bieneman PLC

(57) ABSTRACT

A bumper assembly includes a bumper beam, an inner extension, an outer extension, and a reinforcing element. The bumper beam extends longitudinally from a first end to a second end. The inner extension is welded to the first end of the bumper beam, and the outer extension is welded to the inner extension. The inner extension and the outer extension are elongated from the bumper beam and define an elongated cavity therebetween. The reinforcing element is fastened to the inner extension and disposed in and elongated along the cavity.

19 Claims, 8 Drawing Sheets

(56) References Cited

U.S. PATENT DOCUMENTS

| | | |
|---|---|---|
| 9,073,502 B2 | 7/2015 | Blumel et al. |
| 9,139,146 B2 | 9/2015 | Nakanishi |
| 9,199,591 B2 | 12/2015 | Weil et al. |
| 9,260,135 B2 | 2/2016 | Butkukuri et al. |
| 9,290,140 B2 | 3/2016 | Matsushiro |
| 9,327,665 B2 | 5/2016 | Barbat et al. |
| 9,527,464 B2 | 12/2016 | Clauser et al. |
| 9,539,966 B2 | 1/2017 | Kato et al. |
| 9,550,463 B2 * | 1/2017 | Hara .................. B60R 19/34 |
| 2006/0181090 A1 | 8/2006 | Boivin et al. |
| 2007/0176442 A1 | 8/2007 | Mori et al. |
| 2007/0200373 A1 | 8/2007 | Miller et al. |
| 2009/0140546 A1 | 6/2009 | Okabe et al. |
| 2014/0091595 A1 | 4/2014 | Ramoutar et al. |
| 2014/0312637 A1 | 10/2014 | Ramoutar et al. |
| 2015/0151698 A1 | 6/2015 | Lee et al. |
| 2015/0151699 A1 | 6/2015 | Kaneko et al. |
| 2015/0298634 A1 | 10/2015 | Hara et al. |
| 2015/0336525 A1 | 11/2015 | Nam et al. |
| 2016/0144814 A1 | 5/2016 | Ahn |

FOREIGN PATENT DOCUMENTS

| | | |
|---|---|---|
| DE | 10256000 A1 | 6/2004 |
| DE | 102006002871 A1 | 8/2007 |
| DE | 102010023987 A1 | 2/2011 |
| EP | 0949092 A1 | 10/1999 |
| EP | 2415643 A1 | 2/2012 |
| EP | 2540575 | 1/2013 |
| FR | 2903061 A1 | 1/2008 |
| KR | 01583520000 B1 | 1/1999 |
| KR | 20150134977 A | 12/2015 |
| WO | 2011058623 A1 | 5/2011 |
| WO | 2012101923 A1 | 8/2012 |
| WO | 2014173476 A1 | 10/2014 |
| WO | 2015015067 A1 | 2/2015 |

* cited by examiner

VEHICLE BUMPER ASSEMBLY

BACKGROUND

Bumpers assemblies of vehicles are designed absorb energy and/or transfer energy during vehicle impacts. Such vehicle impacts may include frontal impacts. Frontal impacts may be simulated with crash tests, such as, a frontal impact test, a frontal oblique impact test, small offset rigid barrier (SORB) test, etc. As one example, the Insurance Institute for Highway Safety (IIHS) sets a standard for a SORB frontal crash test in which the vehicle impacts a rigid barrier at 40 miles/hour with 25% of an outer portion of the vehicle overlapping the rigid barrier.

The design of the bumper assembly to absorb and/or transfer energy during vehicle impacts may create difficulties in other design factors, such as manufacturing and vehicle styling. In particular, the size and shape of the bumper assembly affects the outward aesthetic appearance of the front end of the vehicle. There remains an opportunity to design a bumper assembly that satisfies these competing design factors.

DETAILED DESCRIPTION

Figure 2:
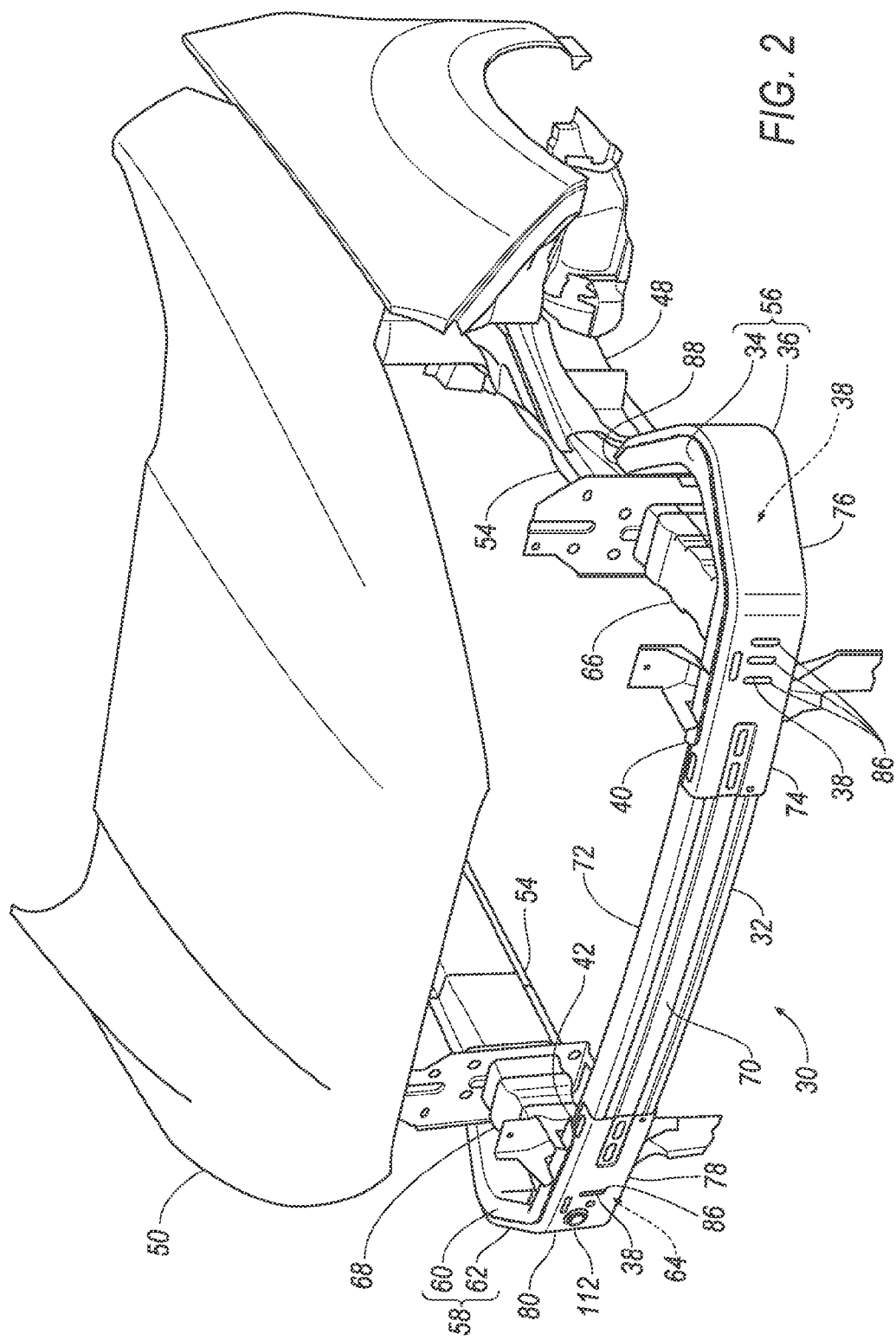
FIG. 2 is a perspective view of a bumper assembly and vehicle frame.

With reference to the Figures, wherein like numerals indicate like parts throughout the several views, a bumper assembly 30 includes a bumper beam 32, an inner extension 34, an outer extension 36, and a reinforcing element 38. With reference to FIG. 2, the bumper beam 32 extends longitudinally from a first end 40 to a second end 42. The inner extension 34 is welded to the first end 40 of the bumper beam 32, and the outer extension 36 is welded to the inner extension 34. The inner extension 34 and the outer extension 36 are elongated from the bumper beam 32 and define an elongated cavity 44 therebetween. The reinforcing element 38 is fastened to the inner extension 34 and disposed in and elongated along the cavity 44.

The reinforcing element 38 may strengthen the bumper assembly 30 and may improve performance of a vehicle 46 during a vehicle impact, such as a SORB impact scenario. In particular, the reinforcing element 38 reinforces the bumper beam 32, the inner extension 34, and the outer extension 36 to absorb energy during the vehicle impact and/or to push the vehicle in a cross-vehicle direction to reduce the energy transferred to the vehicle during the vehicle impact. Fastening the reinforcing element 38 to the inner extension 34 may reduce design restrictions on the possible shape of the bumper assembly. Specifically, the fastening of the reinforcing element 38 to the inner extension 34 may reduce or eliminate welds that would require sufficient space for welding tools to reach a boundary between the reinforcing element 38 and the inner extension 34. By reducing or eliminating such welds, the fastening of the reinforcing element 38 to the inner extension 34 eliminates the necessity for space for the welding tools, which may allow the bumper assembly 30 to be shaped in shapes not otherwise possible, e.g., with relatively sharp angles between the inner extensions 34, 36, and the bumper beam 32.

Figure 1:
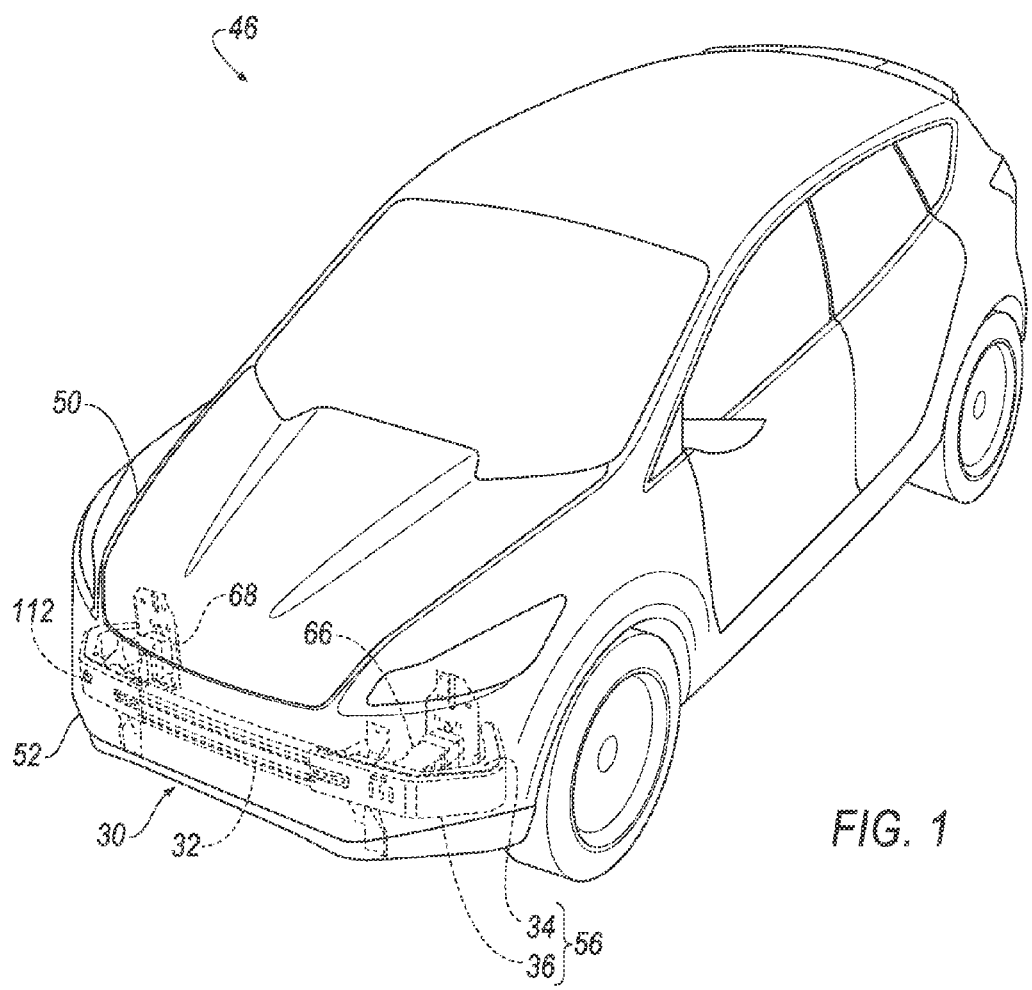
FIG. 1 is a perspective view of a vehicle.

With reference to FIG. 1, the vehicle 46 may include a frame 48, a hood 50, and the bumper assembly 30 attached to the frame 48 below the hood 50. The bumper assembly 30 may be disposed toward a front of the vehicle 46. The vehicle 46 may include a fascia 52 concealing the bumper. The fascia 52 may be supported by the frame 48 and/or body components of the vehicle.

With reference to FIG. 2, the frame 48 may support body components of the vehicle 46. The frame 48 may include upper chassis rails 54. The frame 48 may be of a unibody construction in which at least some of the frame 48 is exposed and may present a class-A surface (not numbered), i.e., a surface specifically manufactured to have a high-quality, finished aesthetic appearance free of blemishes. The frame 48 may, alternatively, be of a body-on-frame construction, or of any other suitable construction. The frame 48 may be formed of any suitable material, for example, steel, aluminum, etc.

The upper chassis rails 54 may extend longitudinally in the direction of travel for the vehicle 46, i.e., a vehicle fore-aft direction, toward a front of the vehicle 46. The upper chassis rails 54 may be attached to the bumper assembly 30, as set forth further below.

With continued reference to FIG. 2, the bumper assembly 30 may include two extensions 56, 58, specifically, extension 56 and second extension 58. The extension 56 includes the inner extension 34, the outer extension 36, and the reinforcing element 38. The second extension 58 includes a second inner extension 60, a second outer extension 62, and another reinforcing element 38 (not shown). The extension 56 may be disposed at the first end 40 of the bumper beam 40, and the second extension 58 may be disposed at the second end 42 of the bumper beam 40. The extensions 56, 58 may be mirror images of each other.

With continued reference to FIG. 2, the bumper beam 32 extends longitudinally from the first end 40 to the second end 42. The bumper beam 32 may have a vehicle-forward face 70 and a vehicle-rearward face 72, which respectively face the direction of the vehicle 46 when traveling forward and the direction of the vehicle 46 when traveling in reverse. The bumper beam 32 may reinforce the structural integrity of the vehicle 46. The bumper beam 32 may be formed of any suitable material, for example, steel, aluminum, etc.

Figure 3:
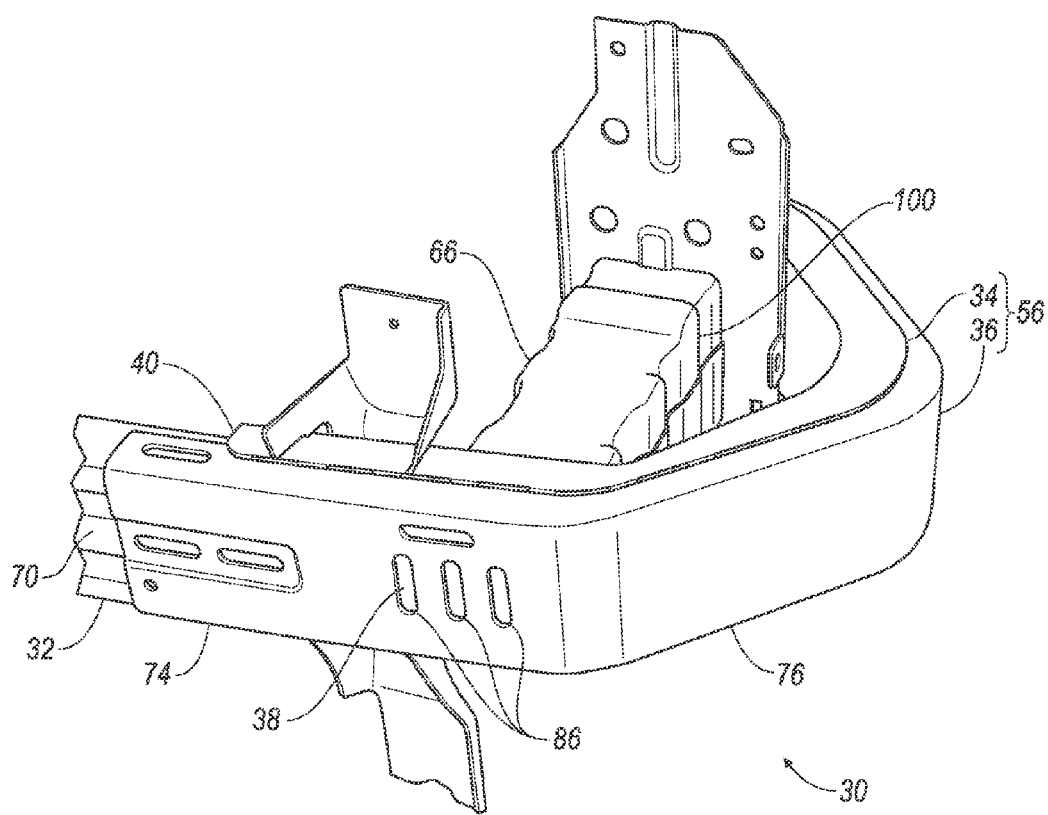
FIG. 3 is a perspective view of a portion of the bumper assembly.

With reference to FIG. 3, the extension 56 is attached to the first end 40 of the bumper beam 32 and has a segment 74 parallel to the bumper beam 32 and a leg 76 extending transversely relative to the bumper beam 32. The second extension 58 is attached to the second end 42 of the bumper beam 32 and has a second segment 78 parallel to the bumper beam 32 and a second leg 80 extending transversely relative to the bumper beam 32. The leg 76 and the second leg 80 extend from the vehicle-rearward face 72 of the bumper beam 32.

The extensions 56, 58 each include an inner extension 34, 60 and an outer extension 36, 62 attached together. The inner extension 34 is welded to the first end 40 of the bumper beam 32, and the second inner extension 60 is welded to the second end 42 of the bumper beam 32. Specifically, the inner extension 34 and the second inner extension 60 abut, and are welded to, the vehicle-rearward face 72 of the bumper beam 32. The inner extension 34, 60 define at least a portion of the leg 76, 80 and at least a portion of the segment 74, 78. The inner extension 34, 60 may be formed of any suitable material, for example, steel, aluminum, etc.

The outer extension 36 is welded to the inner extension 34, and the second outer extension 62 is welded to the second inner extension 60. The outer extension 36 may include holes 86 aligned with an end 94 of the reinforcing element 38, and the outer extension 36 may be welded to the reinforcing element 38 at the holes 86. Likewise, although not shown in the figures, the second outer extension 62 may include holes 86 aligned with an end 94 of the second reinforcing element 64, and the second outer extension 62 may be welded to the respective reinforcing element 38 at the holes 86.

Figure 4:
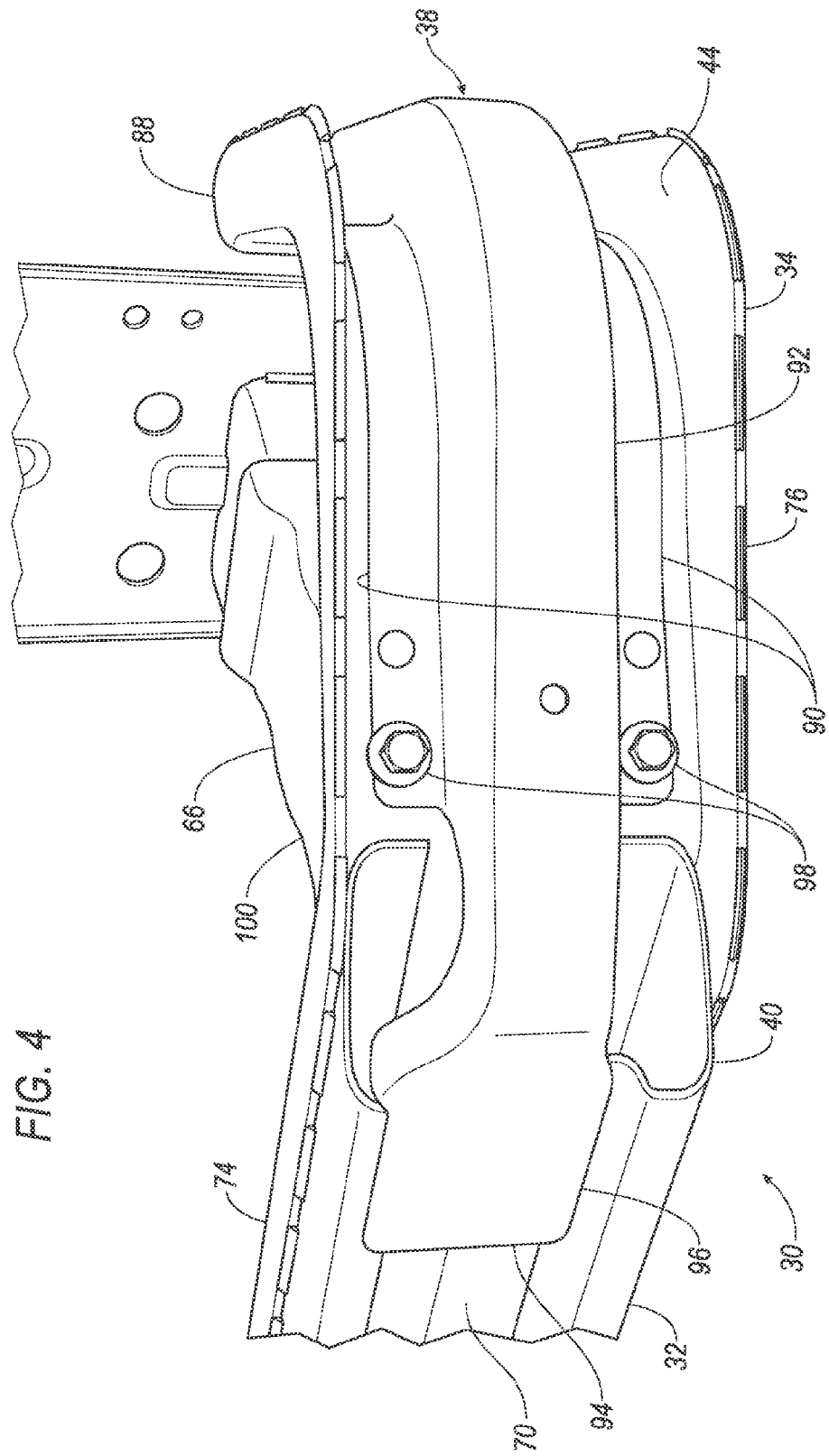
FIG. 4 is a perspective view of a portion of the bumper assembly with an outer beam removed for illustrative purposes.

The inner extension 34, 60 and the outer extension 36, 62 may be elongated from the bumper beam 32 and define the elongated cavity 44 therebetween. With reference to FIG. 4, the reinforcing element 38, 64 may be disposed in and elongated along the cavity 44, between the inner extension 34, 60 and outer extension 36, 62.

With reference to FIGS. 1-4, the extension 56, 58, namely the inner extension 34, 60 and the outer extension 36, 62, includes a cantilevered end 88 spaced from the bumper beam 32. The inner extension 34, 60 and the outer extension 36, 62 may extend coaxially from the bumper beam 32 to the cantilevered end 88. The inner extension 34, 60 and the outer extension 36, 62 may be welded to each other between the bumper beam 32 and the cantilevered end 88. The frame 48 may include a protrusion or other suitable feature for contacting the cantilevered end 88 in the event the cantilevered end 88 is moved in the vehicle-rearward direction during a vehicle impact.

With reference to FIG. 4, the reinforcing element 38, 64 may include flanges 90 abutting the inner extension 34, 60 in the cavity 44 and a rib 92 between the flanges 90 extending coaxially with the inner extension 34, 60. The rib 92 may be elongated along the cavity 44.

The reinforcing element 38, 64 may include an end 94 abutting the first end 40 of the bumper beam 32, specifically, an arm 96 extending from the rib 92 to the first end 40 of the bumper beam 32. The arm 96 may be sandwiched between the holes 86 and the bumper beam 32. The holes 86 in the outer extension 36 may be aligned with the arm 96, and the outer extension 36 may be welded to the arm 96 at the holes 86.

Figure 5:
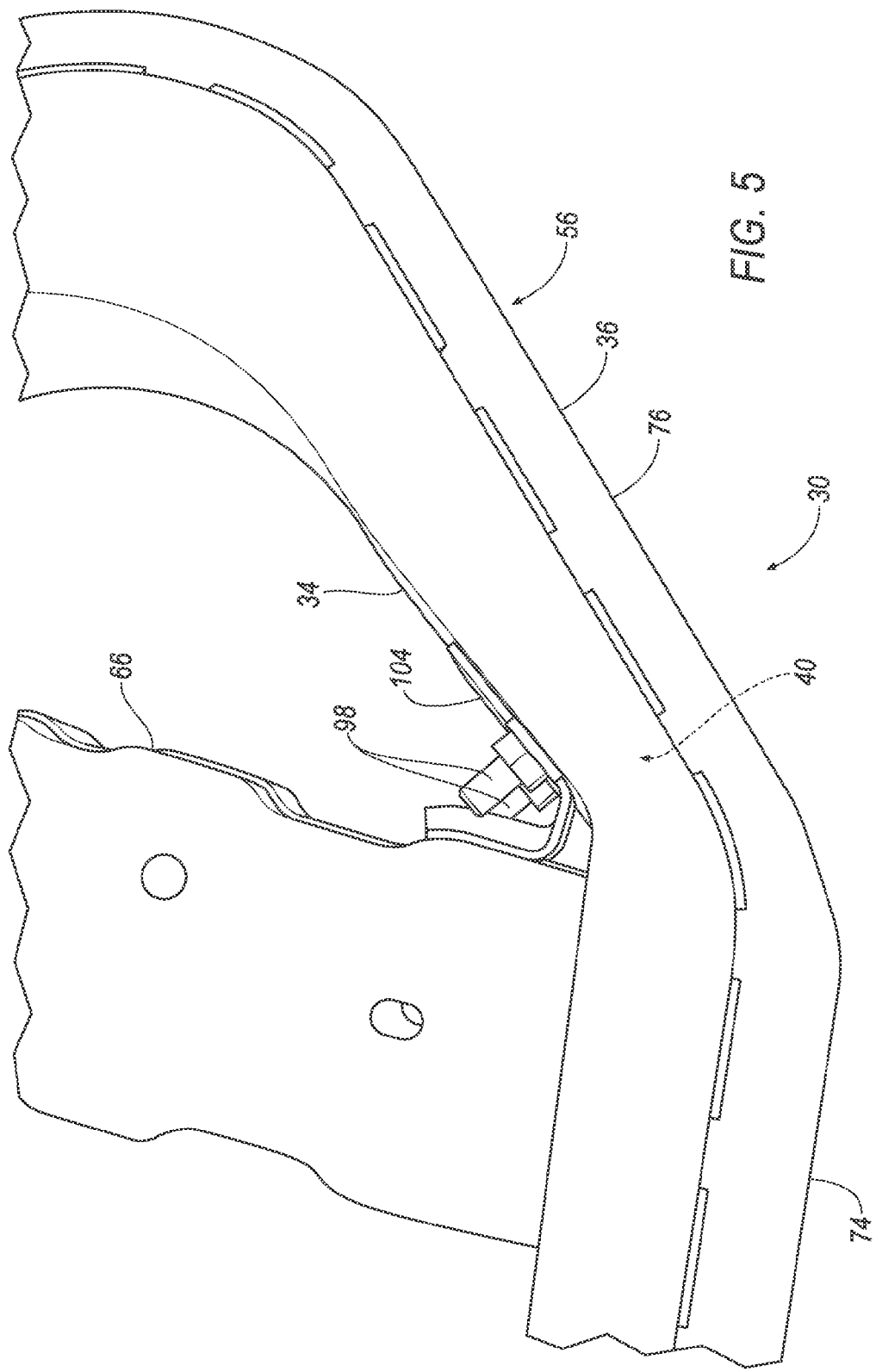
FIG. 5 is a top view of a portion of the bumper assembly.

With reference to FIGS. 4-8, the reinforcing element 38 may be fastened to the inner extension 34, 60. Specifically, fasteners 98 may fasten the reinforcing element 38 to the inner extension 34 and the respective reinforcing element 38 to the second inner extension 60. The fasteners 98 may be threaded bolts and nuts, as shown in FIG. 5, or any other suitable fastener. The flanges 90, in particular, of the reinforcing elements 38, 64 may be fastened to the inner extension 34; specifically, the fasteners 98 may fasten the flanges 90 to the inner extension 34 adjacent the arm 96.

The extensions 56, 58 may extend longitudinally along a path, respectively, arced relative to the bumper beam 32. In particular, the path may extend from the bumper beam 32 in the vehicle-rearward direction. The extensions 56, 58 may extend outboard of the upper chassis rails 54, respectively, and may turn inwardly toward the upper chassis rails 54. The inner extensions 34 60 and the outer extensions 36, 62 may extend longitudinally along the path defining the elongated cavity 44 along the path. The inner extensions 34, 60 may extend longitudinally along the paths, respectively, inside the elongated cavity 44.

With reference to FIGS. 2-8, the bumper assembly 30 may include crush cans 66, 68 supporting the rest of the bumper assembly 30 on the frame 48. In other words, crush cans 66, 68 extend from the frame 48 to the bumper beam 32 and supports the weight of the bumper beam 32 and the extensions 56, 58. The crush cans 66, 68 may, for example, be fastened to the upper chassis rails 54. The crush can 66, 68 may be attached, for example, welded, to the inner extension 34, 60. Specifically, the crush cans 66, 68 may be attached to the segments 74, 78.

The crush cans 66, 68 may extend from the vehicle-rearward face 72 of the bumper beam 32. The crush can 66 may include a wall 100 defining a cavity 102 elongated in a direction transverse to the bumper beam 32.

The crush cans 66, 68 may serve as energy absorbers, sometimes known as "crumple zones." The crush cans 66, 68 may absorb some of the energy of a collision of the vehicle 46 through deformation, thus lessening the amount of energy transferred to the rest of the frame 48 and the vehicle 46.

With reference to FIGS. 5-8, bumper assembly 30 may include a bracket 104 fixed to the crush can 66, 68 and welded to the extension 56. The bracket 104 may be external to the extension 56, 58 and the crush can 66, 68. The bracket 104 may be attached to the inner extension 34, such as to the leg 76, 80, and to the crush can 66, 68. Specifically, the bracket 104 may be welded to the vehicle rearward face 72 of the legs 76, 80 of the extensions 56, 58 and welded to the crush cans 66, 68.

Figure 6:
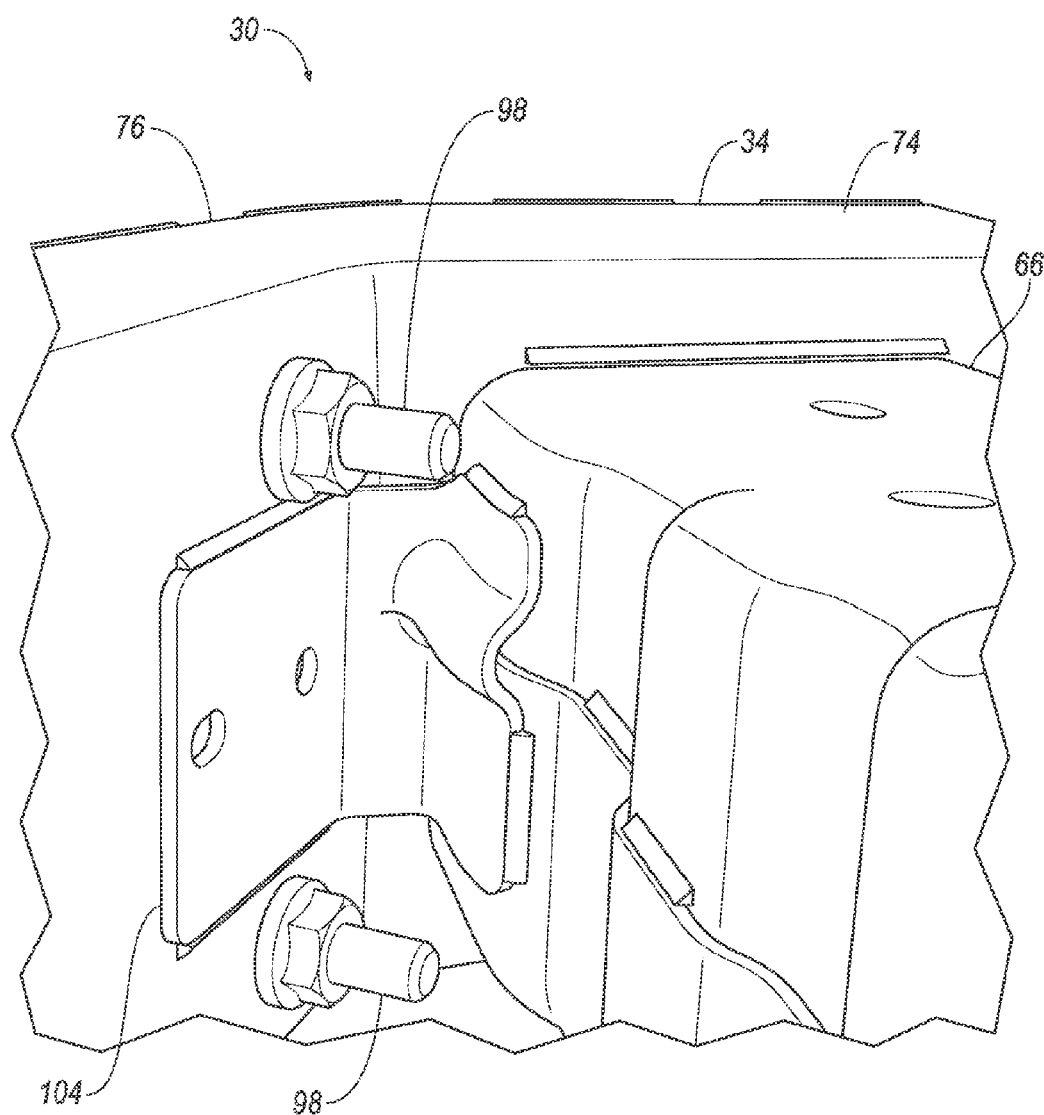
FIG. 6 is a rear perspective view of a portion of the bumper assembly
Figure 7:
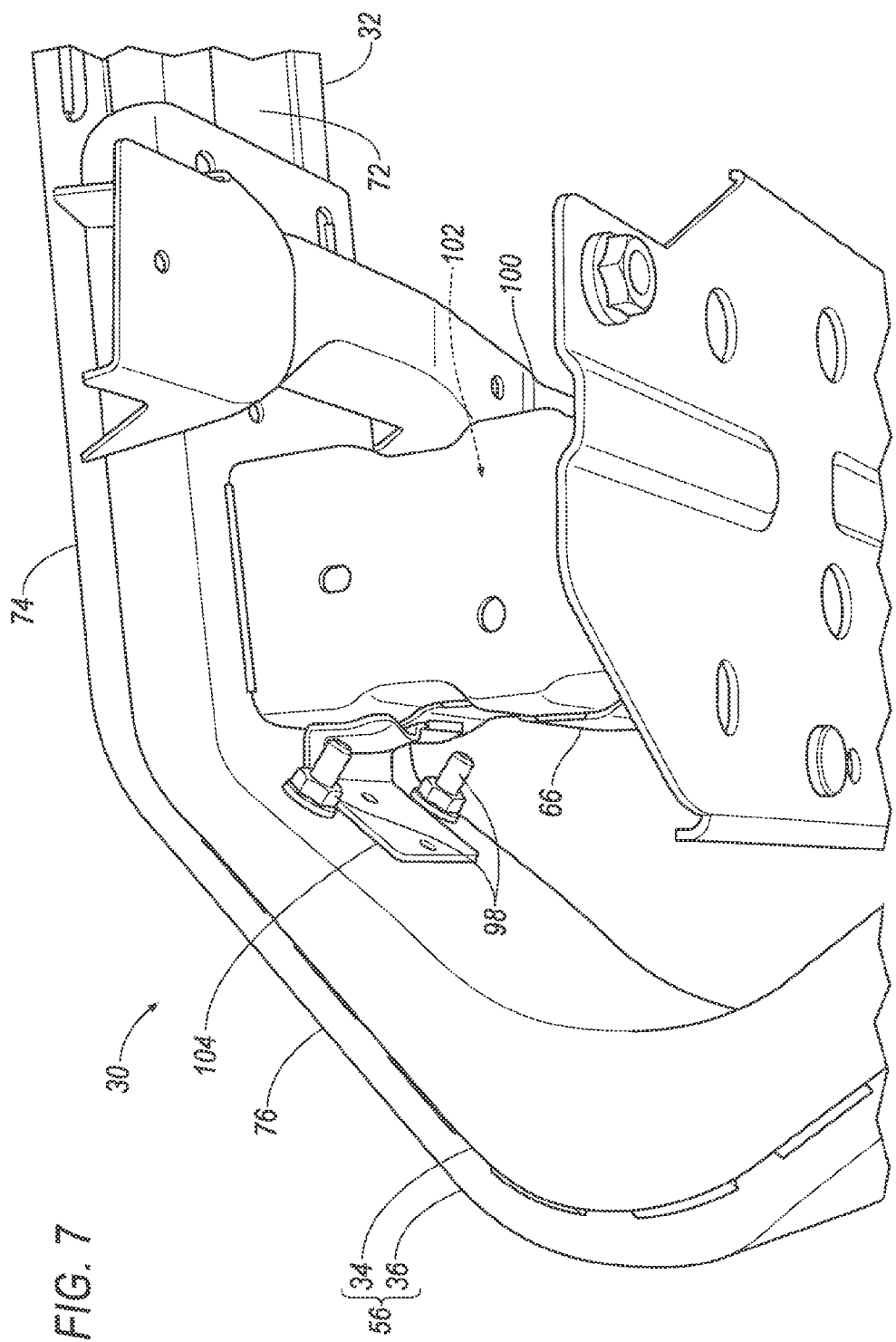
FIG. 7 is another rear perspective view of a portion of the bumper assembly.

The bracket 104 may extend along an acute angle defined between the leg 76, 80 and the crush can 66, 68. The bracket 104 may be, for example, generally V-shaped. The bracket 104 may, for example, extend along the legs 76, 80 between the fasteners 98, as shown in FIGS. 6 and 7. The bracket 104 may be formed of any suitable type of material, e.g., steel, aluminum, etc.

The bracket 104 may strengthen the bumper assembly 30 and may improve performance of a vehicle 46 during a vehicle impact, such as a SORB impact scenario. In particular, the bracket 104 reinforces the bumper beam 32, the inner extension 34, and the outer extension 36 to absorb energy during the vehicle impact and/or to push the vehicle in a cross-vehicle direction to reduce the energy transferred to the vehicle during the vehicle impact. The welding of the bracket 104 may reduce design restrictions on the possible shape of the bumper assembly 30. Specifically, the bracket 104 positions welds between the crush can 66 and the extension 56 to relatively easily accessible positions. This reduces or eliminates difficult to access weld locations, which may allow the bumper assembly 30 to be shaped in shapes not otherwise possible, e.g., with relatively sharp angles between the extensions 34, 36, and the crush cans 66.

Figure 8:
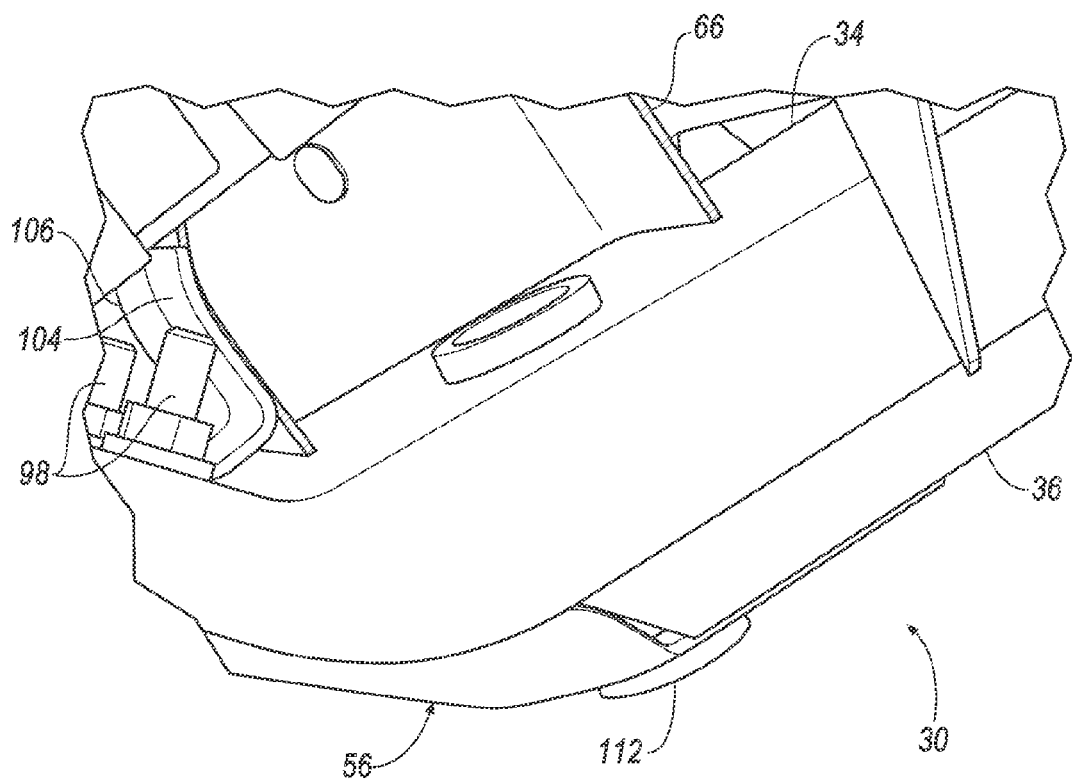
FIG. 8 is a top view of the bumper assembly including a barrel nut for a tow hook.

With reference to FIGS. 1, 2, and 8, a barrel nut 112 may be attached to and extend through the inner extension 34 and the outer extension 36. The barrel nut 112 may be designed to receive a tow hook. This placement of the barrel nut 112 allows the tow hook to take advantage of the strength of the frame 48 rather than relying on external components of the vehicle 46.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A bumper assembly comprising:
   a bumper beam extending longitudinally from a first end to a second end;
   an inner extension welded to the first end of the bumper beam;
   an outer extension welded to the inner extension;
   the inner extension and the outer extension being elongated from the bumper beam and defining an elongated cavity therebetween; and
   a reinforcing element fastened to the inner extension and disposed in and elongated along the cavity.

2. The bumper assembly of claim 1, wherein the inner extension and the reinforcing element extend longitudinally along a path arced relative to the bumper beam.

3. The bumper assembly of claim 1, further comprising a crush can welded to the inner extension.

4. The bumper assembly of claim 1, further comprising a plurality of bolts fastening the reinforcing element to the inner extension.

5. The bumper assembly of claim 1, further comprising a second inner extension welded to the second end of the bumper beam, a second outer extension welded to the second inner extension, and a second reinforcing element fastened to the second inner extension.

6. The bumper assembly of claim 5, further comprising a crush can welded to the inner extension, and a second crush can welded to the second inner extension.

7. The bumper assembly of claim 5, further comprising a plurality of bolts fastening the reinforcing element to the inner extension and the second reinforcing element to the second inner extension.

8. The bumper assembly of claim 1, further comprising a barrel nut attached to and extending through the inner extension and outer extension and designed to receive a tow hook.

9. The bumper assembly of claim 1, wherein the reinforcing element includes an end abutting the first end of the bumper beam.

10. The bumper assembly of claim 9, wherein the outer extension includes holes aligned with the end of the reinforcing element, the outer extension being welded to the reinforcing element at the holes.

11. The bumper assembly of claim 1, wherein the reinforcing element includes a rib elongated along the cavity.

12. The bumper assembly of claim 1, wherein the inner extension and the outer extension include a cantilevered end spaced from the bumper beam, the inner extension and the outer extension extending coaxially from the bumper beam to the cantilevered end.

13. The bumper assembly of claim 12, wherein the inner extension and the outer extension are welded to each other between the bumper beam and the cantilevered end.

14. The bumper assembly of claim 1, wherein the reinforcing element includes flanges abutting the inner extension in the cavity, and a rib between the flanges extending coaxially with the inner extension.

15. The bumper assembly of claim 14, wherein the flanges are fastened to the inner extension.

16. The bumper assembly of claim 14, wherein the reinforcing element includes an arm extending from the rib to the first end of the bumper beam.

17. The bumper assembly of claim 16, further comprising fasteners fastening the flanges to the inner extension adjacent the arm.

18. The bumper assembly of claim 16, wherein the outer extension includes holes aligned with the arm, and wherein the outer extension is welded to the arm at the holes.

19. The bumper assembly of claim 18, wherein the arm is sandwiched between the holes and the bumper beam.

* * * * *